United States Patent
Chuang

[19]

[11] Patent Number: 6,032,243
[45] Date of Patent: *Feb. 29, 2000

[54] DATA-TRANSFER INTERCONNECTION FOR SIGNAL AND DATA TRANSFER BETWEEN CD-ROM DECODER AND BUFFER MEMORY

[75] Inventor: Cheng-Te Chuang, Pa-Te, Taiwan

[73] Assignee: United Microelectronics Corp., Hsinchu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/851,546

[22] Filed: May 5, 1997

[30] Foreign Application Priority Data

Apr. 1, 1997 [TW] Taiwan ................... 86205072

[51] Int. Cl.$^7$ ................... G06F 12/00
[52] U.S. Cl. ................... 711/220; 711/111; 711/211
[58] Field of Search ................... 711/111, 211, 104, 711/105, 171, 172, 220, 1; 395/284, 307; 345/517; 365/230.02, 194; 371/21.1

[56] References Cited

U.S. PATENT DOCUMENTS

| | | | |
|---|---|---|---|
| 4,716,527 | 12/1987 | Graciotti | 395/307 |
| 4,870,622 | 9/1989 | Aria et al. | 365/230.02 |
| 4,912,658 | 3/1990 | Sfarti et al. | 345/517 |
| 5,471,632 | 11/1995 | Gavin et al. | 395/284 |
| 5,644,538 | 7/1997 | Merritt | 365/194 |
| 5,726,994 | 3/1998 | Matsuura et al. | 371/21.1 |

*Primary Examiner*—Do Hyun Yoo
*Assistant Examiner*—Nasser Moazzami
*Attorney, Agent, or Firm*—Finnegan, Henderson, Farabow, Garrett & Dunner, L.L.P.

[57] ABSTRACT

A data-transfer interconnection is devised for signal and data transfer between a CD-ROM decoder and a buffer memory associated with the CD-ROM decoder. In particular, the CD-ROM decoder including a data I/O port for data transfer of a total of a first number of bits and the buffer memory including a data I/O port for data transfer of a total of a second number of bits, where the second number is greater than the first number. One example of the use of this data-transfer interconnection is to allow an 8-bit CD-ROM decoder to gain access to a 16-bit DRAM buffer memory. The data-transfer interconnection is suitable for use on Fast Page-Mode DRAMs and Extended Data Out DRAMs. Each word of the 16-bit data in the DRAM is divided into a high-segment portion and a low-segment portion, which two segments can be accessed respectively through the control by a high-segment column-address strobe signal and a low-segment column-address strobe signal. This data-transfer interconnection allows the CD-ROM decoder to gain access to 16-bit DRAM-based buffer memory with the addition of just one more signal line without having to upgrade the 8-bit data bus to 16-bit ones, which is a quite a costly solution to implement.

17 Claims, 2 Drawing Sheets

DATA-TRANSFER INTERCONNECTION FOR SIGNAL AND DATA TRANSFER BETWEEN CD-ROM DECODER AND BUFFER MEMORY

BACKGROUND OF THE INVENTION

1. Field of the Invention

This invention relates to data-transfer interconnections for signal and data transfer between various IC devices, and more particularly, to a data-transfer interconnection for signal and data transfer between a CD-ROM (compact-disc read-only memory) decoder and its associated buffer memory, for example a DRAM (dynamic random-access memory). More specifically, the data-transfer interconnection of the invention allows a CD-ROM decoder having an 8-bit data bus to gain access to a 16-bit DRAM buffer memory by the incorporation of just one additional signal line between the CD-ROM decoder and the DRAM buffer memory.

2. Description of Related Art

A CD-ROM decoder is customarily coupled to a random access memory unit, usually referred to as buffer memory, for temporary storage of the decoded data. The size of the buffer memory significantly affect the overall performance of the CD-ROM drive. Conventionally, dynamic random access memory (DRAM) is used as the buffer memory for a CD-ROM decoder.

FIG. 1 is a schematic diagram showing the signal and data lines connected between the IC of an 8-bit CD-ROM decoder 17 and the IC of an 8-bit DRAM buffer memory 18. The signal/data lines includes an (n+1)-bit address bus 11 connected between the output address port ADDRESS on the CD-ROM decoder 17 and the input address ports $A_0$–$A_n$ on the DRAM buffer memory 18; a $\overline{WE}$ (write enable) signal line 12 connected between the output port $\overline{WE}$ on the CD-ROM decoder 17 and the input port $\overline{WE}$ on the DRAM buffer memory 18; an $\overline{OE}$ (output enable) signal line 13 connected between the output port $\overline{OE}$ on the CD-ROM decoder 17 and the input port $\overline{OE}$ on the DRAM buffer memory 18; a $\overline{RAS}$ (row-address strobe) signal line 14 connected between the output port $\overline{RAS}$ on the CD-ROM decoder 17 and the input port $\overline{RAS}$ on the DRAM buffer memory 18; a $\overline{CAS}$ (column-address strobe) signal line 15 connected between the output port $\overline{CAS}$ on the CD-ROM decoder 17 and the input port $\overline{CAS}$ on the DRAM buffer memory 18; and an 8-bit data bus 16 connected between the 8-bit parallel data I/O port DATA on the CD-ROM decoder 17 and the data I/O port $DQ_{1-8}$ on the DRAM buffer memory 18. The $\overline{WE}$, $\overline{OE}$, $\overline{RAS}$, and $\overline{CAS}$ signals are each a one-bit signal.

The foregoing data-transfer interconnection is devised for the 8-bit CD-ROM decoder 17 to gain access to the 8-bit DRAM buffer memory 18. It is also suitable for use on 4-bit DRAMs. However, when it is desired to expand the buffer memory to a 16-bit system the data bus 16 should be expanded also from 8-bit to 16-bit, which requires the data bus 16 to be also expanded to 16-bit. As a result, an additional 8 data lines are required. This will increase the number of pins on the IC of the CD-ROM decoder 17 by eight, thus increasing the manufacturing cost.

Presently, most CD-ROM drives are based on a decoder that is designed for use with 8-bit DRAMs. However, most of the DRAMs on the market are 16-bit or higher, and 8-bit DRAMs are not very widely available so their prices are higher than the 8-bit ones. The more costly 8-bit DRAMs are therefore required to be used with prior CD-ROM decoders.

One solution is to redesign the CD-ROM decoder to a 16-bit system that can use 16-bit DRAMs as the buffer memory. However, as mentioned earlier, this will require an additional 8 pins on the IC of the CD-ROM decoder, which causes the packaging cost of the IC of the CD-ROM decoder to be high.

SUMMARY OF THE INVENTION

It is therefore a primary objective of the present invention to provide a data-transfer interconnection which allows an 8-bit CD-ROM decoder to gain access to a 16-bit DRAM buffer memory without having to significantly increase the number of signal/data lines between the CD-ROM decoder and the DRAM buffer memory.

In accordance with the foregoing and other objectives of the present invention, a data-transfer interconnection for the data communication between an 8-bit CD-ROM decoder and a 16-bit DRAM is provided. This data-transfer interconnection is suitable for use on both of the Fast Page-Mode DRAMs and the Extended Data Out (EDO) DRAMs.

Broadly speaking, the invention provides a data-transfer interconnection for signal and data transfer between a CD-ROM decoder and a buffer memory associated with the CD-ROM decoder; the CD-ROM decoder includes a parallel data I/O port having a total of a first number of bit lines, while the buffer memory includes a data I/O port having a total of a second number of bit lines, where the second number is greater than the first number.

In one example, the first number is 8 and the second number is 16. The data-transfer interconnection is used to allow an 8-bit CD-ROM decoder to gain access to a 16-bit DRAM buffer memory. Each word of the second number of bits is partitioned into a high-segment portion and a low-segment portion with equal number of bits. In the case of 16-bit DRAM, each word is divided into a high-byte portion and a low-byte portion which can be accessed by the 8-bit data bus during different periods.

The data-transfer interconnection includes the following signal/data lines between the 8-bit CD-ROM decoder and the 16-bit buffer memory:

(a) an address bus for transferring an addressing signal from the CD-ROM decoder to the buffer memory;

(b) a write-enable signal line for transferring a write-enable signal from the CD-ROM decoder to the buffer memory;

(c) an output-enable signal line for transferring an output-enable signal from the CD-ROM decoder to the buffer memory;

(d) a row-address strobe signal line for transferring a row-address strobe signal from the CD-ROM decoder to the buffer memory;

(e) a low-segment column-address strobe signal line for transferring a low-segment column-address strobe signal from the CD-ROM decoder to the buffer memory;

(i) a high-segment column-address strobe signal line for transferring a high-segment column-address strobe signal from the CD-ROM decoder to the buffer memory; and (g) a data bus including a total of bit lines equal to the first number, said data bus having a first end connected to the I/O port of the CD-ROM decoder and a second end connected both to the high-segment portion and the low-segment portion of the I/O port of the buffer memory.

BRIEF DESCRIPTION OF DRAWINGS

The invention can be more fully understood by reading the following detailed description of the preferred embodiments, with reference made to the the accompanying drawings, wherein.

DETAILED DESCRIPTION OF PREFERRED EMBODIMENT

This invention allows an 8-bit CD-ROM decoder to gain access to a 16-bit DRAM. The large capacity of the 16-bit DRAM allows the CD-ROM decoder to operate with enhanced performance.

Figure 2:
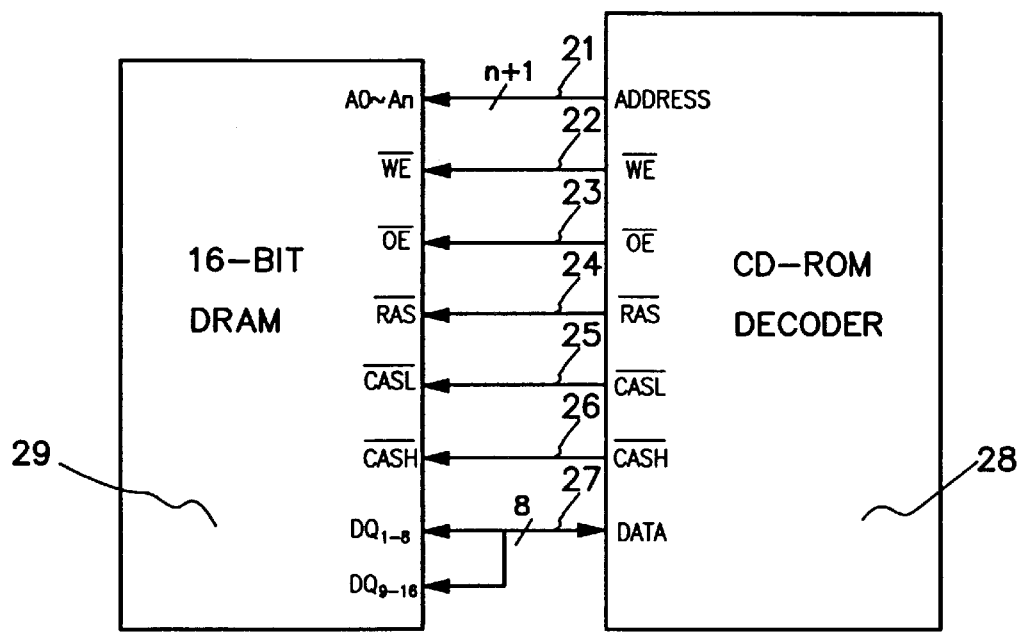
FIG. 2 is a schematic diagram, showing the data-transfer interconnection between a CD-ROM decoder and a DRAM unit in accordance with the invention.

FIG. 2 shows a schematic diagram of the data-transfer interconnection of the invention which allows a CD-ROM decoder 28 having an 8-bit parallel data I/O port DATA to gain access to a 16-bit DRAM buffer memory 29 having an 16-bit data I/O port $DQ_{1-8}$ and $DQ_{9-16}$.

The data-transfer interconnection includes an (n+1)-bit address bus 21 connected between the output address port ADDRESS on the CD-ROM decoder 28 and the input address ports $A_0$–$A_n$ on the 16-bit DRAM buffer memory 29; a $\overline{WE}$ (write enable) signal line 22 connected between the output port $\overline{WE}$ on the CD-ROM decoder 28 and the input port $\overline{WE}$ on the DRAM buffer memory 29; an $\overline{OE}$ (output enable) signal line 23 connected between the output port $\overline{OE}$ on the CD-ROM decoder 28 and the input port $\overline{OE}$ on the DRAM buffer memory 29; a $\overline{RAS}$ (row-address strobe) signal line 24 connected between the output port $\overline{RAS}$ on the CD-ROM decoder 28 and the inputport $\overline{RAS}$ on the DRAM buffer memory 29; a $\overline{CASL}$ (column-address strobe for low-byte) signal line 25 connected between the output port $\overline{CASL}$ on the CD-ROM decoder 28 and the input port $\overline{CASL}$ on the DRAM buffer memory 29; a $\overline{CASH}$ (column-address strobe for high-byte) signal line 26 connected between the output port $\overline{CASH}$ on the CD-ROM decoder 28 and the input port $\overline{CASH}$ on the DRAM buffer memory 29; and an 8-bit data bus 27 having one end connected to the 8-bit parallel data I/O port DATA on the CD-ROM decoder 28 and the other end connected to both of the low-byte data I/O port $DQ_{1-8}$ and the high-byte data I/O port $DQ_{9-6}$ on the DRAM buffer memory 29. The $\overline{WE}$, $\overline{OE}$, $\overline{RAS}$, $\overline{CASL}$, and $\overline{CASH}$ signals are each a one-bit signal.

Figure 1:
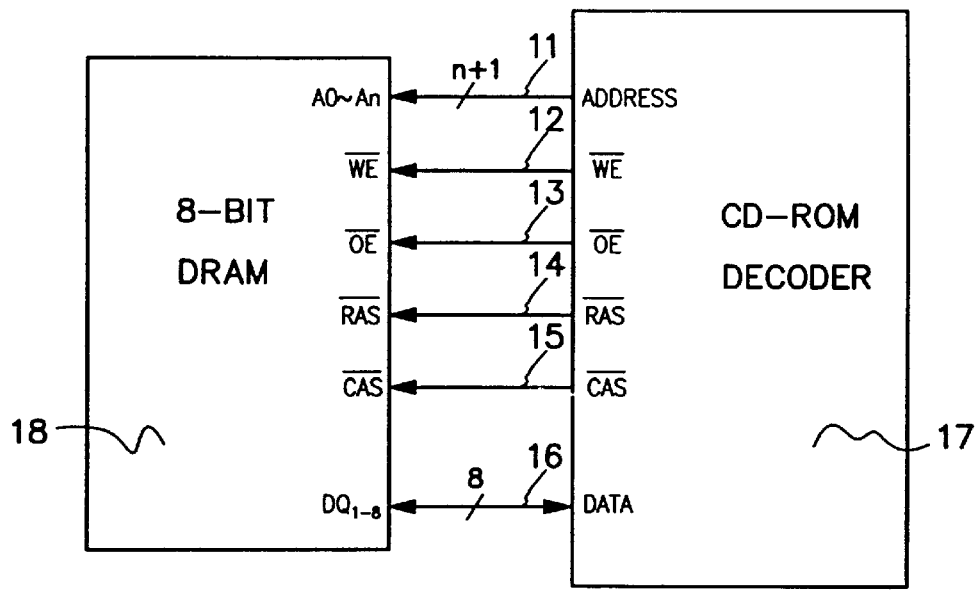
FIG. 1 is a schematic diagram, showing a conventional data-transfer interconnection between a CD-ROM decoder and a DRAM unit.

The foregoing data-transfer interconnection differs from the prior art of FIG. 1 in that the $\overline{CAS}$ signal line in the prior art is here replaced by the two signal lines $\overline{CASL}$, $\overline{CASH}$. The 8-bit data bus 27 from the CD-ROM decoder 28 is connected both to the low-byte data I/O port $DQ_{1-8}$ and the high-byte data I/O port $DQ_{9-16}$ on the 16-bit DRAM buffer memory 29. In accordance with the invention, the two signals $\overline{CASL}$, $\overline{CASH}$ allow the CD-ROM decoder 28 to gain access to the 16-bit DRAM buffer memory 29 via the 8-bit data bus 27. The operation will be described in the following.

In accordance with the invention, the CD-ROM decoder 28 can gain access to the 16-bit DRAM buffer memory 29 by using the $\overline{CASL}$ and $\overline{CASH}$ signals to enable and disable the $DQ_{1-8}$ and $DQ_{9-16}$ during different periods of the access operation. In this preferred embodiment, the state of the low-byte data I/O port $DQ_{1-8}$ and the high-byte data I/O port $DQ_{9-16}$ in response to the logic state of $\overline{RAS}$, $\overline{CASL}$, $\overline{CASH}$, $\overline{WE}$, and $\overline{OE}$ during read/write operation by the CD-ROM decoder 28 are shown in Table 1.

To read out the high-byte portion of the addressed 16-bit data, the CD-ROM decoder 28 switches $\overline{CASL}$ to a LOGIC-HIGH level, thereby enabling the I/O port $DQ_{9-6}$ to output the high-byte portion of the addressed 16-bit data while putting the I/O port $DQ_{1-8}$ in a high-impedance state (abbreviated as Hi-Z in Table 1) allowing the CD-ROM decoder 28 to receive the high-byte portion of the addressed 16-bit data from the I/O port $DQ_{9-16}$.

Subsequently, to read out the low-byte portion of the addressed 16-bit data, the CD-ROM decoder 28 switches $\overline{CASL}$ to the LOGIC-LOW level and $\overline{CASH}$ to the LOGIC-HIGH level, thereby enabling the I/O port $DQ_{1-8}$ to output the low-byte portion of the addressed 16-bit data while putting the I/O port $DQ_{9-16}$ in a high-impedance state, allowing the CD-ROM decoder 28 to receive the low-byte portion of the addressed 16-bit data from the I/O port $DQ_{1-8}$.

On the other hand, in the write operation, when it is desired to write data into the high-byte portion of a word at a certain address in the DRAM buffer memory 29, the CD-ROM decoder 28 switches $\overline{CASH}$ to the LOGIC-LOW level and $\overline{CASL}$ to the LOGIC-HIGH level, thereby disabling the I/O port $DQ_{1-8}$ while enabling the I/O port $DQ_{9-16}$ to receive in the current 8-bit data on the data bus 27 that are outputting from the CD-ROM decoder 28.

Further, when it is desired to write data into the low-byte portion of a word at a certain address in the DRAM buffer memory 29, the CD-ROM decoder 28 switches $\overline{CASH}$ to the LOGIC-HIGH level and $\overline{CASL}$ to the LOGIC-LOW level, thereby disabling the I/O port $DQ_{9-16}$ while enabling the I/O port $DQ_{1-8}$ to receive in the current 8-bit data on the data bus 27 that are outputting from the CD-ROM decoder 28.

The truth table of the foregoing read/write operations are summarized in the following.

TABLE 1

| Control Signals from CD-ROM Decoder | | | | | I/O Ports on the DRAM | | |
| --- | --- | --- | --- | --- | --- | --- | --- |
| $\overline{RAS}$ | $\overline{CASL}$ | $\overline{CASH}$ | $\overline{WE}$ | $\overline{OE}$ | $DQ_{1-8}$ | $DQ_{9-16}$ | State |
| H | H | H | H | H | Hi-Z | Hi-Z | Standby |
| L | L | H | H | L | Enabled to output data | Hi-Z | Read out a low byte |
| L | H | L | H | L | Hi-Z | Enabled to output data | Read out a high byte |
| L | L | H | L | H | Enabled to receive data | Don't Care | Write in a low byte |

TABLE 1-continued

| Control Signals from CD-ROM Decoder | | | | | I/O Ports on the DRAM | | |
| --- | --- | --- | --- | --- | --- | --- | --- |
| $\overline{RAS}$ | $\overline{CASL}$ | $\overline{CASH}$ | $\overline{WE}$ | $\overline{OE}$ | $DQ_{1-8}$ | $DQ_{9-16}$ | State |
| L | H | L | L | H | Don't Care | Enabled to receive data | Write in a high byte |

Figure 3:
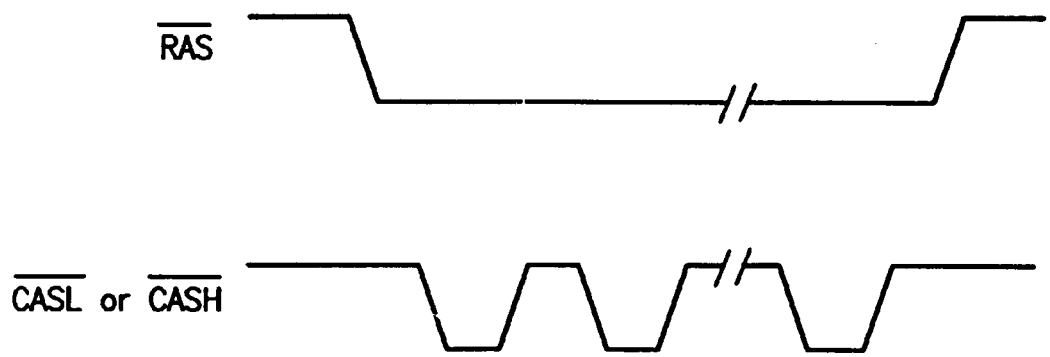
FIG. 3 is a waveform diagram showing the timing relationship between a row-address strobe signal and a column-address strobe signal that are used by the CD-ROM decoder to gain access to a Fast Page-Mode DRAM buffer memory.

$\overline{RAS}$: Row-Address Strobe
$\overline{CASL}$: Column-Address Strobe for Low-Byte
$\overline{CASH}$: Column-Address Strobe for High-Byte
$\overline{WE}$: Write Enabie
$\overline{OE}$: Output Enable
$DQ_{1-8}$: low-byte data I/O port $DQ_{1-8}$
$DQ_{9-16}$: high-byte data I/O port $DQ_{9-16}$
State: the current access operation of the CD-ROM decoder The performance of the access operations to the DRAM buffer memory 29 can be enhanced by operating in the Page Mode of the DRAM buffer memory 29. In this mode, the $\overline{CASL}$ or $\overline{CASH}$ signal is repeatedly switched between the LOGIC-LOW and LOGIC-HIGH levels during the period when $\overline{RAS}$ is switched to the LOGIC-LOW level, as illustrated in FIG. 3.

The Extended Data Out DRAM is a variation of the conventional Fast Page-Mode DRAM. One feature of the Extended Data Out DRAM is that, when the row-address strobe signal is maintained continuously at the LOGIC-LOW level and the column-address strobe signal is switched from the LOGIC-LOW level back to the LOGIC-LOW level to complete one read operation, the data I/O port of the DRAM will not be reset to a high-impedance state, but instead maintained at the level of the current output data. Accordingly, when the invention is used on an Extended Data out DRAM, the $\overline{CASL}$ and $\overline{CASH}$ signals are not allowed to switch in an interleaved manner between the LOGIC-LOW and LOGIC-HIGH levels. Otherwise, the high-byte portions of the addressed 16-bit data will conflict with each other, causing the CD-ROM decoder to be unable to receive data from the Extended Data Out DRAM.

Figure 4:
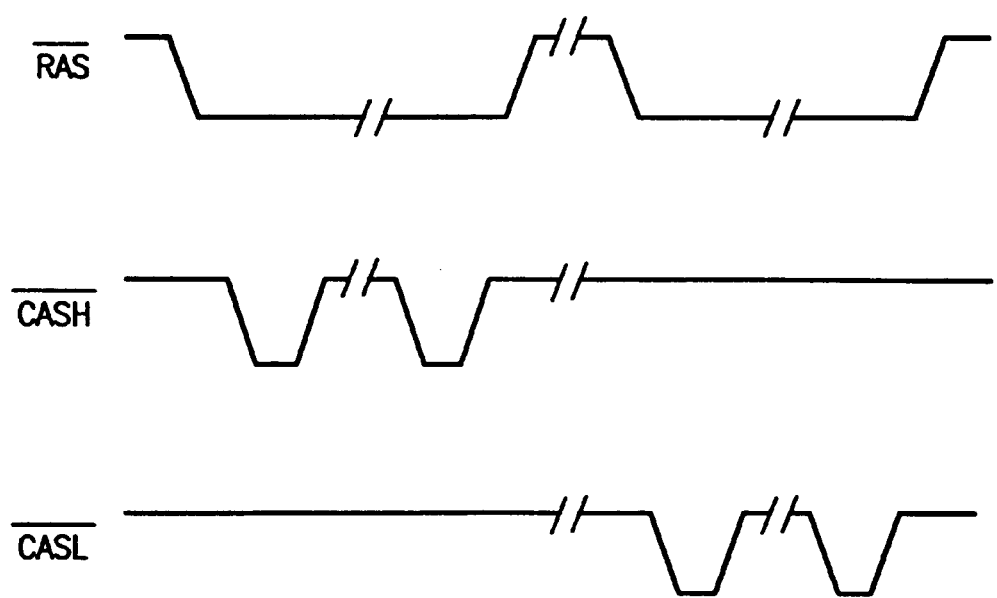
FIG. 4 is a waveform diagram showing the timing relationship between a row-address strobe signal and two column-address strobe signals that are used by the CD-ROM decoder to gain access to an Extended Data Out DRAM buffer memory

One solution to the foregoing problem is described in the following with reference to FIGS. 2 and 4. In accordance with the invention, only one of the two column-address strobe signals $\overline{CASH}$ and $\overline{CASL}$ is enabled during each period when the row-address strobe signal $\overline{RAS}$ is switched to the LOGIC-LOW level, as illustrated in FIG. 4. In other words, during one period when $\overline{RAS}$ is switched to the LOGIC-LOW level, only the $\overline{CASH}$ signal is switched repeatedly between LOGIC-HIGH and LOGIC-LOW levels while the $\overline{CASL}$ remains continuously at the LOGIC-HIGH level; and during one subsequent period when $\overline{RAS}$ is switched again to the LOGIC-LOW level, only the $\overline{CASL}$ signal is switched repeatedly between LOGIC-HIGH and LOGIC-LOW levels while the $\overline{CASH}$ remains continuously at the LOGIC-HIGH level.

To achieve the foregoing purpose, the manner in which the data from the CD-ROM decoder 28 is stored in the DRAM buffer memory 29 should be arrange as follows.

Assume the address inputs of the DRAM buffer memory 29 are $A_0-A_n$, and the data address in the CD-ROM decoder 28 is $B_0-B_{2n+2}$. This scheme allows the CD-ROM decoder 28 to address $2^{2n+3}$ bytes of data. The $B_0-B_{2n+2}$ data address in the CD-ROM decoder 28 is mapped to the row address and column address in the DRAM buffer memory 29 and the two column-address strobe signals $\overline{CASL}$ and $\overline{CASH}$ in the following manner:

(a) $B_0-B_n$ is used as the column address of the DRAM buffer memory 29.
(b) The bit $B_m$, $n+1 \leq m \leq 2n+2$, is used to control the state of $\overline{CASL}$ and $\overline{CASH}$ in the following manner:

When $B_m=1$, $\overline{CASL}$ is switched to and maintained at the LOGIC-HIGH level thereby allowing the access operation to the DRAM buffer memory 29 to be solely controlled by $\overline{CASH}$.
When $B_m=0$, $\overline{CASH}$ is switched to and maintained at the LOGIC-HIGH level, thereby allowing the access operation to the DRAM buffer memory 29 to be solely controlled by $\overline{CASL}$.

(c) The bit sequence $\{B_i\}$, $n+1 \leq i \leq 2n+2$ and $i \neq m$, is used as the row address of the DRAM buffer memory 29.

In the case of a 256k×16 DRAM, since n=8 ($256k=2^{2*8+3}$), the DRAM buffer memory 29 has 9 address inputs $A_0-A_8$ and the CD-ROM decoder 28 has 19-bit data address. If m is selected to be 18, the column address of the DRAM buffer memory 29 is $B_0-B_8$, and the row address of the same is $B_9-B_{17}$. When $B_{18}$ is at a first logic value, for example 1, the CD-ROM decoder 28 uses $\overline{CASH}$ to gain access to the DRAM buffer memory 29 while keeping $\overline{CASL}$ at the LOGIC-HIGH level. On the other hand, when $B_{18}$ is at a second logic value, for example 0, the CD-ROM decoder 28 uses $\overline{CASL}$ to gain access to the DRAM buffer memory 29 while keeping $\overline{CASH}$ at the LOGIC-HIGH level.

Compared to the prior art of FIG. 1, the data-transfer interconnection between the CD-ROM decoder 28 and the 16-bit DRAM buffer memory 29 needs only one more signal line than the conventional data-transfer interconnection between the CD-ROM decoder 17 and the 8-bit DRAM buffer memory 18. That is, the $\overline{CAS}$ signal line in the prior art is here replaced by two signal lines $\overline{CASL}$ and $\overline{CASH}$. This benefit allows the CD-ROM decoder to gain access to 16-bit DRAM-based buffer memory without having to upgrade the 8-bit data bus to 16-bit ones, which is a quite a costly solution. Moreover, current 16-bit DRAMs are cheaper than 8-bit ones, so that using the data-transfer interconnection in accordance with the invention to allow a CD-ROM decoder to gain access to 16-bit DRAM buffer memory represents a highly cost-effective solution.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A data-transfer interconnection for signal and data transfer between a CD-ROM decoder and a buffer memory associated with the CD-ROM decoder, the CD-ROM decoder including a data I/O port for data transfer of a total of a first number of bits and the buffer memory including a data I/O port for data transfer of a total of a second number of bits, where the second number is greater than the first number, the second number of bits being partitioned into a high-segment portion and a low-segment portion;

the data-transfer interconnection comprising:

an address bus for transferring an addressing signal from the CD-ROM decoder to the buffer memory;

a write-enable signal line for transferring a write-enable signal from the CD-ROM decoder to the buffer memory;

an output-enable signal line for transferring an output-enable signal from the CD-ROM decoder to the buffer memory;

a row-address strobe signal line for transferring a row-address strobe signal from the CD-ROM decoder to the buffer memory;

a low-segment column-address strobe signal line for transferring a low-segment column-address strobe signal from the CD-ROM decoder to the buffer memory;

a high-segment column-address strobe signal line for transferring a high-segment column-address strobe signal from the CD-ROM decoder to the buffer memory; and a data bus including a total of bit lines equal to the first number, said data bus having a first end connected to the I/O port of the CD-ROM decoder and a second end connected both to the high-segment portion and the low-segment portion of the I/O port of the buffer memory.

2. The data-transfer interconnection of claim 1, wherein the buffer memory is a Fast Page-Mode DRAM.

3. The data-transfer interconnection of claim 1, wherein the buffer memory is an Extended Data Out DRAM.

4. The data-transfer interconnection of claim 1, wherein the buffer memory is a 16-bit DRAM.

5. The data-transfer interconnection of claim 4, wherein the data bus is an 8-bit data bus.

6. A data-transfer interconnection for signal and data transfer between a digital device and a random-access memory unit associated with the digital device, the digital device including a data I/O port for data transfer of a total of a first number of bits and the random-access memory unit including a data I/O port for data transfer of a total of a second number of bits, where the second number is greater than the first number, the second number of bits being partitioned into a high-segment portion and a low-segment portion;

the data-transfer interconnection comprising:

an address bus for transferring an addressing signal from the digital device to the random-access memory unit;

a write-enable signal line for transferring a write-enable signal from the digital device to the random-access memory unit;

an output-enable signal line for transferring an output-enable signal from the digital device to the random-access memory unit;

a row-address strobe signal line for transferring a row-address strobe signal from the digital device to the random-access memory unit;

a low-segment column-address strobe signal line for transferring a low-segment column-address strobe signal from the digital device to the random-access memory unit;

a high-segment column-address strobe signal line for transferring a high-segment column-address strobe signal from the digital device to the random-access memory unit; and a data bus including a total of bit lines equal to the first number, said data bus having a first end connected to the I/O port of the digital device and a second end connected both to the high-segment portion and the low-segment portion of the I/O port of the random-access memory unit.

7. The data-transfer interconnection of claim 6, wherein the random-access memory unit is a Fast Page-Mode DRAM.

8. The data-transfer interconnection of claim 6, wherein the random-access memory unit is an Extended Data Out DRAM.

9. The data-transfer interconnection of claim 6, wherein the random-access memory unit is a 16-bit DRAM.

10. The data-transfer interconnection of claim 9, wherein the data bus is an 8-bit data bus.

11. A digital device, comprising:

a first column-address strobe signal output port for outputting a first column-address strobe signal; and a second column-address strobe signal output port for outputting a second column-address strobe;

wherein the first and second column-address strobe signals are used to select either a high-segment portion or a low-segment portion of n-bits of data stored in a memory buffer associated with the digital device when reading and writing data from or to that memory buffer; n is any positive multiple of 2; and the first column-address and the second column-address strobe signals are not enabled simultaneously.

12. The digital device of claim 11, wherein the digital device is a decoder.

13. The digital device of claim 11, wherein the decoder is a CD-ROM decoder.

14. The digital device of claim 11, further comprising:

an address bus output port for outputting an addressing signal from the digital device;

a write-enable signal output port for outputting a write-enable signal from the digital device;

an output-enable signal output port for outputting an output-enable signal from the digital device; and a row-address strobe signal output port for outputting a row-address strobe signal from the digital device.

15. An extended data out dynamic random access memory, comprising:

a first column-address strobe signal input port for inputting a first column-address strobe signal; and a second column-address strobe signal input port for inputting a second column-address strobe signal;

wherein the first and second column-address strobe signals are used to select either a high-segment portion or a low-segment portion of n-bits of data stored in the memory when reading and writing data from or to the memory; n is any positive multiple of 2; and the first column-address and the second column-address strobe signals are not enabled simultaneously.

16. The memory of claim 15, further comprising:

an address bus input port for inputting an addressing signal to the memory;

a write-enable signal input port for inputting a write-enable signal to the memory;

an input-enable signal input port for inputting an input-enable signal to the memory; and a row-address strobe signal input port for inputting a row-address strobe signal to the memory.

17. The memory of claim 16, wherein the memory is a 16-bit DRAM.

* * * * *